UNITED STATES PATENT OFFICE.

WILLIAM WILMINGTON, OF TOLEDO, OHIO.

IMPROVEMENT IN HARVESTING-MACHINES.

Specification forming part of Letters Patent No. 29,026, dated July 3, 1860.

*To all whom it may concern:*

Be it known that I, WILLIAM WILMINGTON, of Toledo, in the county of Lucas and State of Ohio, have invented certain new and useful Improvements in Grain-Thrashing Harvesters; and I do hereby declare that the following is a full, clear, and exact description of the same, reference being had to the accompanying drawings, and to the letters of reference marked thereon.

The nature of my invention consists in arranging a hinged platform and feeding apparatus with a thrashing-cylinder, substantially in the manner hereinafter described.

In the annexed drawings, Figure 1 represents a plan view of the machine. Fig. 2 is a side elevation with one wheel removed. Fig. 3 is a view of the platform and thrashing-cylinder.

In the figures, A A represent the frame of the machine, which is supported by two wheels, which are secured upon an axle which is attached to said frame a little back of its center.

Secured to one of the driving-wheels B is a gear-wheel, C, on one side and a pulley upon the other, (marked $u$.) The gear-wheel C gears into two pinions, D and S, which are situated on opposite sides of it. The pinion S is secured to a shaft, S', upon which is secured a double pulley, J. Two cords pass around this pulley J. One of these cords, $c$, passes around a pulley, K, which is secured upon the shaft of the reel, and is intended for driving said reel, while the other cord, $d$, passes around a pulley, $d'$, which is secured upon the crank-shaft O'.

N N N represent three feeder-bars, which are provided with teeth upon their under sides. The crank-shafts O O' pass through these bars, and when motion is communicated to the pulley $d'$, and by means of it to the crank-shafts and bars, said bars have a rotary reciprocating motion, and serve with their teeth to draw up the straw and grain as it is cut from the cutting apparatus to the thrashing-cylinder, which is situated above them.

The pinion D is secured to an axle, E, upon which axle a double pulley, F, is secured. Two cords or belts pass around this pulley F, one of which cords, $b$, passes around a pulley, G, which is attached to the shaft of the thrashing-cylinder A, and serves to communicate motion to said thrashing-cylinder. The other cord, $a$, passes from pulley F to and around a pulley, W, which is secured upon one of the crank-shafts O''.

O'' O'' are two crank-shafts, which are secured in a portion of the frame A' A' which rises back of the thrashing-cylinder at an angle of about thirty degrees.

N' N' N' represent three bars, which are attached to the shafts O'' O'' for the purpose of carrying the straw up the inclined portion of the frame and away from the machine. These bars are provided, as seen in Fig. 2, with inclined teeth on two sides—top and bottom—and have the same motion as the bars N N N, before described.

R represents a movable platform, to the front of which is attached a cutting apparatus.

I do not propose to confine myself to any peculiar construction of a cutting apparatus, as I may employ any apparatus in use which is well adapted to cutting grain.

The platform R is hinged to the frame at $x$, and turns upon its hinge, so that the cutting apparatus may be raised or lowered while the machine is in operation to accommodate it to the condition of the grain or to the inequalities of the ground. The thrashing-cylinder is located just above the point at which the platform is hinged to the frame. Immediately under the cylinder H is a concave provided with teeth similar to the teeth upon the thrashing-cylinder. The grain is thrashed in passing between the concave and the cylinder by means of the teeth upon the two.

It will be seen that the platform is wider where the grain is cut than it is at its back, or near where it joins onto the frame. The object of this is that I may be enabled to employ a shorter thrashing-cylinder than the width of the swath I am cutting, thus taking less power to drive it than it would if the said cylinder were longer.

On one end of the thrashing-cylinder shaft there is provided a fan, Y, which revolves in a suitable fan-case. This fan forces the air into a flue or vertical chamber close to it, the air passing from said flue into the hopper Z, into which the wheat or grain falls after it passes from the thrashing-cylinder, the said hopper being located below the thrashing-cylinder, as is seen in Fig. 2. The hopper Z is inclined in such a manner that when the grain falls into it it all passes down to one corner, and, coming in contact with a conveying-belt, I, is carried up from said hopper and deposited in the chute I', from whence it drops into bags placed to receive it. The rear of the hopper is open, and the draft of air passing into it at its front carries all the chaff and small straw away from the grain out at this opening at its rear. The belt I is provided either with cups or slats for the purpose of carrying up the grain. There is an opening, as before stated, immediately back of the thrashing-cylinder, through which the grain descends, after being separated, to the hopper Z. Across this opening there are a series of curved teeth, between which the grain falls, but which prevent the short straw from passing down into the hopper with the grain. I may find it convenient to use, instead of these curved teeth, a series of overlapping slats, arranged like window-blind slats, to prevent the straw from falling into the hopper with the grain. When the straw passes from the thrashing-cylinder it is received by the bars N' and carried by them toward the rear of the machine; but as it passes up upon these bars a portion of it falls through between them upon the bottom of the frame A'. When this occurs the teeth on the under side of said bars work this straw back toward the opening through which the grain passes to the hopper. When it arrives at this opening it is again elevated upon the bars N' by means of the teeth secured to the ends of said bars, and is again worked toward the rear of the machine. Thus there are always two layers of straw going in opposite directions, the straw falling under the bars being always worked back, and then up upon the bars and forward again, until it falls from the machine behind.

At the rear of the platform, and above it, is secured a shaft, P, to which is secured a crank. Near the forward end of the platform, and on each side of it, are secured two cords, $e\ e$, which pass back and are secured to the shaft P. When the shaft P is turned by means of the crank attached to it the cords $e\ e$ are wound around it, and thus the forward end of the platform is elevated. By unwinding these cords the platform is lowered. I do not wish to confine myself, however, to this mode of raising and lowering the platform, as I may use any other which is cheap and effective.

The shaft S' is provided with a crank, which works a pitman, 1, said pitman being connected to a bar, 2, which is pivoted to the frame, and to which the cutter-bar 3 is secured. When the crank turns the pitman operates the bar 2, which in turn gives a reciprocating movement to the cutter-bar.

The forward portion of the frame A is supported upon a truck, which always holds the said frame at a fixed distance from the ground.

I am aware that harvesting-machines have been constructed which have rakes and other carrying devices to convey the grain as it is cut to a thrashing-cylinder and winnowing-machines, which are connected and combined for joint operation; also, that the devices which I employ have been long in use separately, and some of them jointly. I therefore do not claim the devices or their combination, irrespective of their peculiar arrangement, by which I economize power and effect a practical operation, which facilitates the cutting, thrashing, and cleaning of the grain by the machine; but What I do claim as my invention, and desire to secure by Letters Patent, is—

The combination of the contracting hinged platform, the rotary reciprocating rakes $o\ o'$, and short thrashing-cylinder, when the parts are arranged and operate jointly with the harvesting and winnowing apparatus, in the manner and for the purpose specified.

WILLIAM WILMINGTON.

Witnesses:
C. M. ALEXANDER,
A. A. YEATMAN.